Jan. 26, 1937. H. W. JONES 2,068,858
FILTERING NIPPLE
Filed Nov. 1, 1932
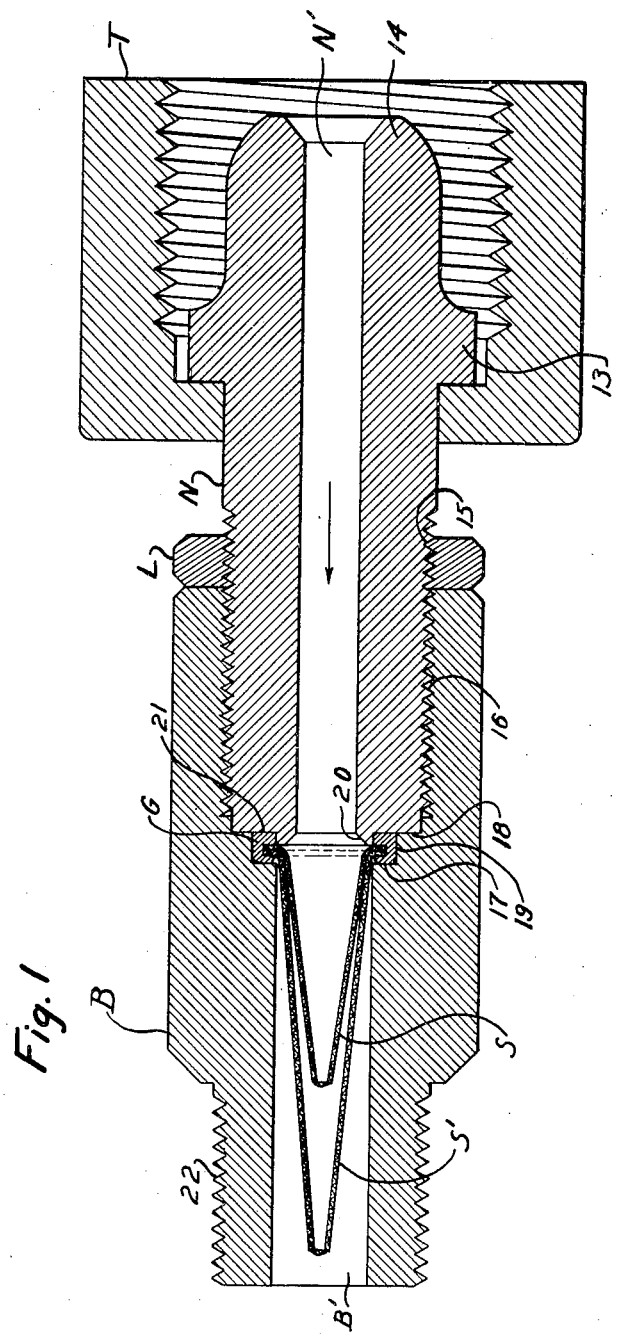
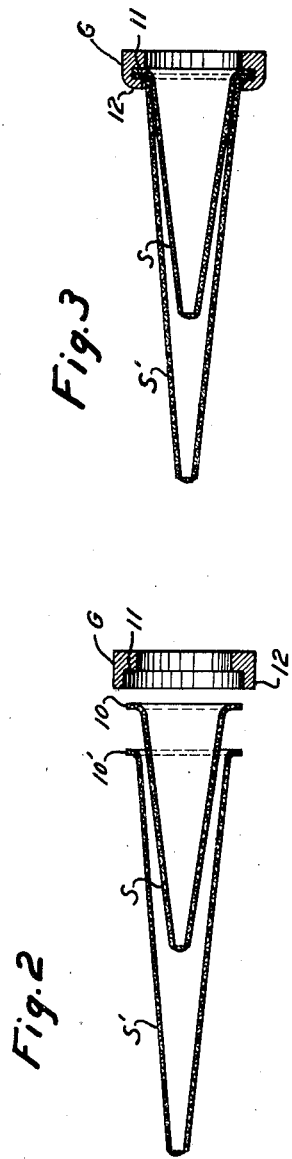
INVENTOR
HOMER W. JONES
BY
ATTORNEY Patented Jan. 26, 1937

2,068,858

UNITED STATES PATENT OFFICE 2,068,858

FILTERING NIPPLE

Homer W. Jones, Williamsville, N. Y., assignor, by mesne assignments, to Union Carbide and Carbon Corporation, a corporation of New York Application November 1, 1932, Serial No. 640,628

9 Claims. (Cl. 183—72)

This invention relates to an improved inlet nipple for valves, fluid pressure regulators, and the like; and more particularly relates to a novel screen assembly for use in such nipples.

Gases, such as those supplied under high pressure from a cylinder of compressed gas, are usually delivered through a pressure reducing and regulating valve to the gas consuming device. These gases frequently contain particles of steel scale and other foreign matter which interfere with the operation of the regulators and cause leakage when they become entrapped in a regulator valve. Although wire mesh screens have been used previously in the inlet passages of valves and regulators, these screens have had small filtering areas because of the small diameter of the passageway and have been subject to clogging as screened matter soon piled up and either interrupted or interfered with the flow of gas. These screens heretofore have been of disk, hemispherical or single short-cone form.

The principal object of the present invention is to provide an improved screen assembly for regulators and valves, wherein objectionable clogging and interference with proper gas flow will be avoided.

In the present invention the difficulty experienced with such prior screens has been overcome by using a plurality of screens of conical shape and of different mesh size. This permits a much larger filtering area (for a given diameter of gas passage) to be exposed to the gas and also permits entrapping particles of various sizes on the different screens. These screens will function for a much longer time before cleaning or repairing is required.

The objects and novel features of the invention will be made apparent by the following description and the accompanying drawing, of which:

Fig. 1 is a view illustrating an inlet nipple and screen assembly embodying this invention;

Fig. 2 is a composite view of the conical screens and a connecting gasket, before assembly; and Fig. 3 is a view of the conical screens and gasket after assembly.

Referring to Figs. 2 and 3, the improved unitary screen assembly may consist of a plurality of nested conical screens having different altitudes and bases of about the same diameter, which latter is about the same as that of the gas passage into which the assembly is inserted. The meshes of the several screens are preferably of progressively smaller size to entrap the largest particles on the first screen and smaller particles on succeeding screens. The bases of the screens are provided with coextensive outwardly extending contiguous flanges which are superposed and firmly secured together, to form a unitary screen assembly.

As shown, two conical screens S, S' may be used, the same having outwardly extending flanges 10, 10' at their bases and the mesh of screen S being larger than that of screen S'. For convenience in handling the screens as a unit, these flanges are firmly secured together. For this purpose I prefer to use a ring G of relatively soft or malleable material which will also function as a gasket to prevent gas leakage around or between the flanges when the screens are in place. As shown, the ring G is of lead and has an annular shoulder 11 surrounded by a rim 12, thus providing an angular recess in the ring to receive the superposed flanges. When the flanges are assembled in this recess, the edge of the rim 12 is spun or bent inwardly over the top flange 10'; thereby pressing the bottom flange 10 tightly against the shoulder 11, sealing the peripheral joint between the flanges, securing the screens together as a unit, and providing at the base thereof a combined gasket and support for securing the unit in place within a nipple or other passage of a gas supply line. In this manner a U-shaped annular gasket G is provided, the arms of which extend over and are secured to the opposite sides of the flanges of the screens S and S'.

As shown in Fig. 1, the improved screen assembly is incorporated in an inlet nipple for supplying gas from a cylinder of compressed gas to a pressure reducing and regulating valve. The nipple may comprise two thread-connected members N and B having alined gas passages N' and B'. The nipple member B is arranged to be secured to an outlet fitting on a gas supply container, and for this purpose a rotatable nut T that bears against a shoulder 13 on the member N is internally threaded to interfit with a similarly threaded part of such outlet fitting to draw the seating end 14 of the member N into gas tight engagement with a corresponding seat on the outlet fitting.

The other end of the nipple member N is externally threaded at 15 to interfit with the similarly internally threaded portion of a counterbore 16 in one end of the other nipple member B, to clamp the base of the screen assembly in gas tight engagement with a shoulder at the bottom of said counterbore. A nut L may be provided to lock the members N and B together against accidental displacement.

The shoulder in the member B between the passage B' and the counterbore 16 is desirably stepped to provide annular shoulders 17 and 18 of different internal diameters, the diameter of the shoulder 17 being substantially the same as the external diameter of the ring G and the height of the wall 19 between these shoulders being somewhat less than the thickness of base of the screen assembly, i. e., the flanges 10, 10' and the ring uniting them. The extreme end of the nipple member N has a lip 20 around the passage N', and an end clamping face 21 around such lip, the outer diameter of such lip being approximately the same as the inner diameter of the ring G, whereby said lip snugly fits into said ring.

Accordingly, when the screen assembly is secured in place as shown in Fig. 1, the end face 21 of the nipple member N engages the ring G and clamps the base of the screen assembly against the shoulder 17. At the same time the soft metal of the ring may be compressed until the face 21 engages the stop shoulder 18, thereby forcing the material of the ring into gas tight engagement with the adjoining surfaces and tightly sealing the joint between the members N and B. The lip 20 serves to confine the ring internally and prevent inward flow of the same while the clamping pressure is being applied. Suitable means, such as the threads 22 on member B, may be provided to couple the nipple to a gas receiving line, a pressure regulator, a valve or the like.

The nested conical screens S, S' are thus rigidly secured in the nipple with their axes coextensive with the axis of the gas passage and in a position to admit the incoming gas into the screens through their open bases. The conical form of the screens presents a maximum filtering area to the gas and the tendency to clog the screens is greatly reduced because the first coarser mesh screen removes the larger foreign particles while the next screen separates the finer particles; and, because of the steepness of the screen walls and the velocity and direction of the incoming gas, the latter tends to automatically clean portions of the screens and collect most of the foreign matter in the apexes of the screens. This leaves the major portions of the screens unobstructed for a much longer period, and therefore the interference with a proper gas flow and the necessity of cleaning the screens or repairing and replacing them is less frequent than in the gas filtering devices now used. Moreover, the improved screen assembly is compact and readily insertable in and removable from the gas supply line, and cooperates with the gas conduit formed by the nipple members to provide a gas tight joint.

While a preferred embodiment of the invention is herein shown and described in detail, it is to be understood that certain features thereof may be used without others and various changes may be made in the construction disclosed without departing from the scope of the invention. For example, the principles of the invention, entirely or in part, may be used to filter fluids other than gas; the improved gasket may consist of other metal, such as copper; said gasket may be secured to the base or periphery of a single screen, of conical or other form, where the latter is suitable for the purpose; in some instances, the nested screens may be of hemispherical form; and the screen and gasket assembly may be clamped in other ways in the fluid supply line.

I claim:

1. The combination of two detachably-connected members having alined fluid passages, one of said members having a stepped counterbore providing inner and outer shoulders of different diameters; a plurality of nested screens of varying altitudes extending into the fluid passage in one of said members; and a gasket permanently secured to the open ends of said screens and clamped against the inner shoulder by the other of said members, said other member having a lip projecting within said gasket and supporting the inner peripheral edge thereof.

2. The combination of two detachably-connected members having alined fluid passages, one of said members having a stepped counterbore providing inner and outer shoulders of different diameters; a cup-shaped screen extending into the fluid passage in one of said members; an annular gasket of deformable material permanently secured to the open end of said screen and clamped against the inner shoulder by the other of said members, said other member having a lip projecting within said gasket and limiting the inward flow thereof.

3. An inlet nipple comprising the combination of two detachably-connected members having alined fluid passages, one of said members having a threaded counterbore cooperating with a threaded portion of the other member, said counterbore being stepped at its bottom to provide an inner shoulder and an outer shoulder of different diameters and said other member having a clamping surface cooperating with said shoulders; a plurality of nested conical screens extending into the fluid passage in the counterbored member, said screens having coextensive superposed flanges at their open ends; a ring of deformable metal encircling and secured to said flanges, said ring being clamped between the inner shoulder and said clamping surface; and a lip on said other member fitting inside said flanges and ring to limit inward flow of the latter when clamping pressure is applied thereto.

4. The combination of detachably-connected members having alined fluid passages; unitary filtering means comprising a plurality of nested screens extending into the fluid passage of one of said members; and a gasket secured to said screens and clamped between said members; one of said members being provided with a recess in which said gasket is seated, and the other of said members being provided with a lip extending into said gasket to secure it in said recess.

5. The combination of detachably-connected members having alined fluid passages; a plurality of nested screens of successively finer mesh in the direction of fluid flow extending into the fluid passage of one of said members; and a gasket suitably secured to both of said screens; in which one of said members is provided with a supporting wall in contact with the outer surface of said gasket, and the other of said members is provided with a supporting wall in contact with the inner surface of said gasket.

6. The combination of detachably-connected members having alined fluid passages; one of said members having a counterbore providing a shoulder adjacent the fluid passage and the end of the other member; a screen in said passage having a flange extending outwardly into said counterbore; and a deformable gasket secured to the outer edge of said flange with one face in contact with said shoulder and the other face in contact with said end; said end being provided with a projecting lip engaging the inside of said gasket.

7. The combination of two detachably-connected members having alined fluid passages; a filter assembly, replaceable as a unit, comprising at least one screen having a flanged margin embraced by an annular gasket of deformable metal; the said gasket being adapted to be clamped between the said members; one of the said members being provided with a recess in which the said gasket is seated, and the other of said members being provided with a lip extending into said gasket to maintain it in said recess during application of clamping pressure thereon.

8. The combination of two detachably-connected members having alined fluid passages; a filter assembly, replaceable as a unit, comprising a plurality of screens having flanged margins and secured together in nested relation at the flanged margins by means of an annular gasket of deformable metal; the said gasket being adapted to be clamped between the said members; one of the said members being provided with a recess in which said gasket is seated; and the other of said members being provided with a lip extending into said gasket to maintain it in said recess during the application of clamping pressure thereon.

9. The combination set forth in claim 8, wherein the outermost screen of the nested plurality is of finer mesh than the innermost screen.

HOMER W. JONES.